Jan. 10, 1956  J. J. BLACK  2,730,611
SUSPENDED LENS CONSTRUCTION FOR VEHICULAR LIGHTS
Filed Sept. 15, 1953

INVENTOR.
James J. Black.
BY Wood, Herron & Evans.
ATTORNEYS.

United States Patent Office 2,730,611
Patented Jan. 10, 1956

2,730,611

SUSPENDED LENS CONSTRUCTION FOR VEHICULAR LIGHTS

James J. Black, Cincinnati, Ohio, assignor to Trailmobile, Inc., Chicago, Ill., a corporation of Delaware Application September 15, 1953, Serial No. 380,217

3 Claims. (Cl. 240—7.1)

This invention relates to vehicular lights of the type mounted on trucks and other commercial vehicles as clearance and marker lights, and is particularly directed to a novel lens mounting for such lights.

Almost all commercial vehicles such as busses, tractor-trailers, trucks and the like, carry clearance lights which are mounted on the front and rear of the vehicle to indicate its width and thereby guide anyone seeking to pass. In addition, most vehicles of this type carry marker lights on their sides to warn anyone approaching from the side, of the vehicle's position.

In order to provide a maximum degree of safety, each of the lamps provided on a vehicle should be lit during periods of darkness and should be effective to emit sufficient light so that the lamp is visible for an appreciable distance, generally at least five hundred feet. However, considerable difficulty has been encountered in maintaining each of the lights on a vehicle in proper condition to perform its function. Frequently, these lights are scraped by low hanging tree branches, and at times they strike lag bolts, pallets, and other objects extending outwardly from loading docks. As a result of such accidents, it often occurs that one or more lenses of the clearance and marker lights on a truck is cracked or completely shattered; and either the bulb is broken and the light fails to function at all, or so much dirt collects within the lamp, that it gives off a totally inadequate amount of illumination.

The principal object of the present invention is to provide a vehicular light in which the lens is extremely well protected against shattering and cracking. More particularly, this invention is predicated upon the concept of suspending a lens within a lamp housing in such a manner that the lens is yieldable in any direction, and is thereby adapted to absorb the force of blows which would break a rigidly mounted lens. In addition, the housing is effective to shield the lens entirely from sideways blows, as well as from many direct blows.

In the preferred embodiment a lamp housing encloses a bulb and reflector surface, and is provided with a peripheral mounting rim which is either attached to the housing or is formed integral with it. The peripheral rim extends outwardly beyond the remainder of the housing, and includes an inwardly facing annular groove. A translucent lens is mounted within the rim, the lens comprising a central portion surrounded by a thickened marginal flange. An outwardly facing annular groove of substantially the same configuration as the groove in the housing rim, is formed along the outer edge of the lens flange.

The lens is supported within the housing by means of a compressible mounting ring, such as a rubber O ring. That is, the lens fits down within the housing; the grooves in the rim and lens flange being disposed in apposition with the mounting ring residing in each of the grooves and being compressed between the lens and rim. The mounting ring is effective to space the lens from the rim, so that the lens is suspended completely free from contact with the housing, and is thereby free to move a limited amount in any direction against the compressive force of the ring.

One of the principal advantages of this construction is that the lens is yieldable inwardly, and consequently will absorb the force of the many blows which would be effective to break a rigidly mounted lens. Another advantage of this construction is that the rim on the lamp housing completely protects the lens against sideways blows, and consequently protects the lens from being knocked off by branches or other objects scraping against it.

A further advantage of the present lamp construction is that the lens can readily be removed to permit cleaning, or replacement of the lamp bulb, and then can easily be replaced after the maintenance operation has been completed. More particularly, the lens can be removed from the housing merely by inserting a screw driver, knife blade, or the like in the lens flange groove and prying the lens outwardly from the housing. In order to replace the lens, the mounting ring is inserted in the lens flange groove and the lens and ring are then forced into the housing until the mounting ring snaps into the groove in the rim. When the mounting ring snaps into the rim groove the lens is properly positioned within the housing. The lens is firmly held in this position by the ring and together with it tightly seals the housing against the entrance of dirt or moisture.

Another advantage of the present lamp is that it is extremely economical to manufacture. There are only five parts, the bulb, housing, lens, and electrical contact. Since the O ring firmly holds the lens in place, there is no need to provide an additional lens retaining ring, or to provide accurately spaced openings in the housing for bolting the ring to hold the lens in place.

Other advantages of the present invention will be more readily apparent from a consideration of the following detailed description of the drawings illustrating a preferred embodiment of the invention.

Figure 1:
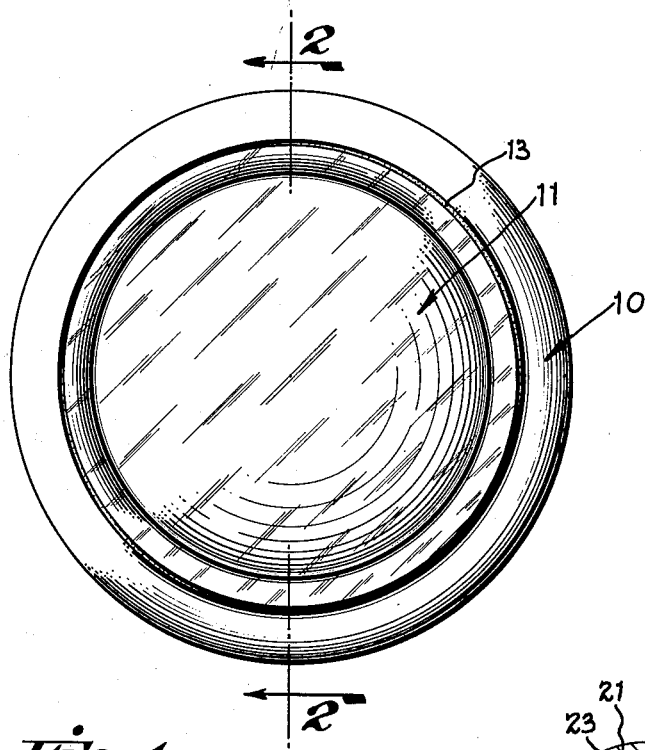
Figure 1 is a front elevational view of a vehicular light embodying a floating lens construction.
Figure 2:
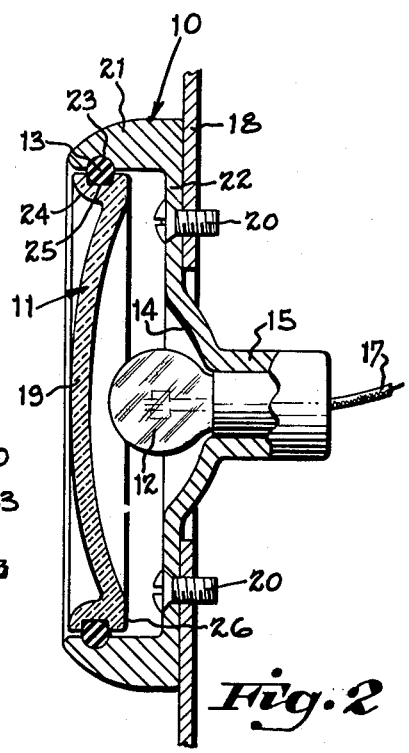
Figure 2 is a cross sectional view taken along line 2—2 of Figure 1.

As shown in Figures 1 and 2, a preferred form of light constructed in accordance with this invention includes a housing 10, a translucent lens 11, a lamp bulb 12 and a compressible mounting ring 13.

More specifically, the housing 10 forms an enclosure for the light bulb 12, and includes a reflecting surface 14 and bulb receiving well 15. A bayonet type slot (not shown) is formed in the well for engagement with a lug provided on the bulb. A suitable electric contact is disposed in the base of the well and is connected to wire 17. Since these elements are conventional and constitute no part of this invention they are not shown in detail. The housing is secured to vehicle body wall 18 by means of bolts 20, passing through suitable bolt holes in the housing and vehicle wall. The housing also includes an upstanding peripheral rim 21, extending outwardly from the rear wall 22 of the housing. Peripheral rim 21, can be formed integral with the housing or can be in the form of a separate ring which is bolted in place; in either case the rim is provided with an inwardly facing annular groove 23 for receiving mounting ring 13 which is preferably in the form of an O ring made from rubber or other compressible material.

Lens 11 is constructed of a translucent material such as glass, Lucite, or other plastic material, and includes a central portion 19 and a marginal flange 24 extending around the periphery of the lens at substantially right angles to the lens surface. Marginal flange 24 is provided with an outwardly facing annular groove 25 of substantially the same size as the annular groove 23 in rim 21. The diameter of the lens is appreciably less than the inner diameter of rim 21, so that there is a clearance between the lens and rim when the lens is inserted in the open end of the housing.

O ring 13 is preferably of circular cross section and is of sufficient size so that when it is inserted between the annular grooves of rim 21 and lens flange 24, it is slightly compressed and is effective to resiliently support the lens in a position completely free from contact with the housing rim. In addition, annular groove 23 is spaced sufficiently far from rear wall 22 of the housing so that when the lens and O ring are snapped into place, the lowermost edge 26 of the lens is spaced an appreciable distance from rear wall 22 of the housing. Thus, the lens is suspended by means of the O ring, completely free from contact with the housing, and is thereby yieldable in any direction.

The lens is preferably convex, the central portion extending outwardly from an area adjacent to the base of the marginal flange. However, in the preferred embodiment the central portion of the lens and the marginal lens flange do not extend outwardly beyond the edge of rim 21. Thus the entire edge of the lens and its convex central portion lie within the confines of upstanding rim 21, which completely surrounds the lens and effectively shields it from sideways blows. The rim also functions to protect the lens from direct frontal blows, since any plane surface, such as the edge of a loading dock will contact the edge of the rim rather than the lens. The lens is further protected by its inwardly yieldable mounting, since even if it should be forced against an irregularly shaped object such as a branch, or a lag bolt or other small object protruding from a loading dock, the lens will be pushed inwardly but will not shatter.

Despite the fact that the lens is yieldably mounted, it is effectively sealed with the housing by means of the resilient mounting ring which is compressed within the annular grooves formed in rim 21 and flange 24. This ring prevents the entrance into the housing of moisture and dirt which would adversely affect the photometric properties of the lamp.

Figure 3:
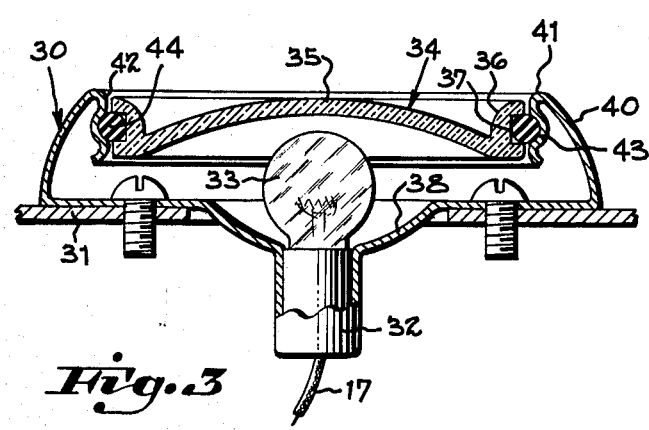
Figure 3 is a cross sectional view similar to Figure 2 of a modification of the light.

A modified form of vehicular lamp construction is shown in Figure 3. As there shown a sheet metal housing 30 is provided instead of the die cast housing of the first embodiment. Housing 30 is bolted or otherwise secured to a vehicle wall 31 and includes a bulb receiving well or socket 32 for holding bulb 33. The open end of the housing contains a lens 34 of the same construction as the lens in the preferred embodiment. Lens 34 includes a convex central portion 35 surrounded by a marginal flange 36 having an outwardly facing annular recess 37. The housing, in addition to well 32, includes a rear reflecting surface 38 and an upstanding peripheral rim 40. The rim preferably comprises an arcuate outer wall 41 and an inwardly turned flange 42, the flange being disposed within the outer wall and being configurated to include an annular recessed portion 43. The lens is supported in the modification in the same way as in the preferred embodiment; that is by means of an O ring 44 compressed between the annular groove in the lens and the groove in the housing rim. Also, as in the preferred embodiment, the diameter of the lens is appreciably less than the inner diameter of the rim so that the lens is suspended completely free from any contact with the housing.

Having described my invention, I claim:

1. A vehicle light comprising a housing, a bulb disposed within the housing, said housing including a rear wall, a peripheral rim upstanding from said rear wall, the inner surface of said rim being configurated to form an annular groove lying in a plane transverse to the axis of the housing, a translucent lens which is smaller in diameter than the inside diameter of the rim and which is disposed within said rim, said lens having an annular groove in its outermost periphery adapted for alignment with the groove in said rim, the annular groove in the lens and the annular groove in the housing rim being so positioned that the rim of the lens lies substantially within and is protected by the housing when the grooves are aligned, a compressible mounting ring disposed intermediate said lens and said rim and residing in engagement with the annular grooves provided in the lens and rim, said mounting ring being of sufficient cross sectional size to support said lens in spaced relationship with said housing rim, and constituting the sole support for said lens, said annular groove in the housing rim being spaced axially outwardly along said rim a sufficient distance from said rear wall so that said lens is resiliently supported free from contact with said rear wall.

2. A vehicle light, comprising a translucent lens having a thick edge containing an annular groove, a ring of resilient material seated in said groove and projecting therefrom, a housing having a light bulb socket therein, and having an axially extending rim wall, the said rim wall being larger at its inside diameter than said lens and having an annular groove therein receiving the projecting portion of said ring and thereby sustaining the said lens resiliently, the edge of the said lens being spaced from said housing for movement axially and laterally of the same, and the said rim wall terminating in a plane which is at least substantially flush with the face of said lens edge to house and protect the same against sidewise blows.

3. In a vehicular light the combination of a sheet metal housing adapted to receive a bulb, said housing including a peripheral rim, said rim comprising a curved outer wall and an inner flange, said inner flange being configurated to form an annular groove lying in a plane transverse to the axis of the housing, a translucent lens which is smaller in diameter than the inside diameter of the rim and which is disposed within said rim, said lens having an annular groove in its outermost periphery adapted for alignment with the groove in said rim, the annular groove in the lens and the annular groove in the housing rim being so positioned that the rim of the lens lies substantially within and is protected by the housing when the grooves are aligned, a compressible mounting ring disposed intermediate said lens and said rim and residing in engagement with the annular grooves provided in the lens and rim, said mounting ring being of sufficient cross sectional size to support said lens in spaced relationship with said housing rim, and constituting the sole support for said lens, said annular groove in the housing rim being spaced axially outwardly along said rim a sufficient distance from said rear wall so that said lens is resiliently supported free from contact with said rear wall.

References Cited in the file of this patent

UNITED STATES PATENTS

| 28,413 | Sellers | May 22, 1860 |
| 1,064,515 | Miller | June 10, 1913 |
| 1,334,924 | Renwick | Mar. 23, 1920 |
| 2,106,144 | Floraday | Jan. 18, 1938 |
| 2,483,058 | Mack | Sept. 27, 1949 |
| 2,707,747 | DeFrees | May 3, 1955 |

FOREIGN PATENTS

| 21,443 | Great Britain | of 1895 |
| 647,374 | Great Britain | Dec. 13, 1950 |